US008226788B1

(12) United States Patent
Quinif

(10) Patent No.: US 8,226,788 B1
(45) Date of Patent: *Jul. 24, 2012

(54) METHOD OF MANUFACTURING A MOLDED DOOR

(76) Inventor: Edward Quinif, Scottsdale, AZ (US)

( * ) Notice: Subject to any disclaimer, the term of this patent is extended or adjusted under 35 U.S.C. 154(b) by 659 days.

This patent is subject to a terminal disclaimer.

(21) Appl. No.: 12/321,960

(22) Filed: Jan. 27, 2009

(51) Int. Cl.
*E06B 3/72* (2006.01)
*B29C 51/08* (2006.01)

(52) U.S. Cl. ..... 156/212; 156/219; 156/257; 52/745.19; 52/745.15; 52/455

(58) Field of Classification Search ........................ None
See application file for complete search history.

(56) References Cited

U.S. PATENT DOCUMENTS 4,008,551 A * 2/1977 MacDonald et al. ........... 52/316
4,327,788 A 5/1982 Turner
4,702,054 A 10/1987 Turner
5,540,026 A * 7/1996 Gartland ......................... 52/455
5,887,402 A * 3/1999 Ruggie et al. .................. 52/455
6,689,301 B1 2/2004 Moyes
2007/0028559 A1* 2/2007 Lynch et al. ................ 52/784.1

* cited by examiner

*Primary Examiner* — John L. Goff
*Assistant Examiner* — Barbara J. Musser

(57) ABSTRACT

A method of molding an inexpensive door skin with stylized panels using machined wooden strips which extend around the panel areas to simulate the appearance of a solid wood door. Wood veneer sections are placed on the mold around the wood strips and in between the panel areas and the laid up assembly is compressed by molding to form a door skin having the appearance of a solid wood door surface with raised panels. A backing of fiberboard such as MDF or similar material is placed against the back of the laid up assembly prior to compression. In another embodiment a door blank is shaped and veneer and strips are laid up on a mold. The door blank and mold are compressed to form a door with a finished surface. The shaped door blank serves as a mold component and as the interior of the finished door.

9 Claims, 7 Drawing Sheets

METHOD OF MANUFACTURING A MOLDED DOOR

FIELD OF THE INVENTION

The present invention relates to manufactured doors and more particularly relates to a method of fabricating door skins which are molded using wood veneer and wood inserts having a backing such as fiberboard which results in an economical product having the finish and appearance of a solid panel door with raised or recessed panels.

BACKGROUND OF THE INVENTION

Various styles and types of manufactured doors are utilized both in residential and commercial business construction. One widely accepted manufactured door uses molded outer door skins over a hollow core of wood or other material. This style of door is popular because of its relative ease of manufacture and use of less expensive materials as compared to solid wood doors. The molded door skin is light-weight and provides an acceptable aesthetic appearance, although not as sharply detailed as solid wood doors.

Molded door skins, while widely used, can be improved by lowering their cost of manufacture and by enhancing their appearance similar to solid wood doors. Conventional doors utilizing door skins, especially those with raised or recessed panels for styling, often do not have the crisp and sharp panel edges of machined wood due to the inherent limitations of conventional molding processes in which a single substrate is formed into a door skin by compression.

Various methods for manufacturing door skins can be found in the prior art. For example, U.S. Pat. No. 4,702,054 shows a raised panel door having a core panel extending within it and panel inserts lodged within the voids of a lattice structure presented on opposite sides of the door. Molding strips overlay and conceal regions where the inserts abut against expanses in the lattice structure defining the voids. A veneer overlay covers margins of the molding strips.

U.S. Pat. No. 4,327,788 discloses a raised panel door for use on kitchen and vanity cabinets and the like which can be quickly and inexpensively constructed from a conventional laminated door having a core and a thin veneer facing. First, an outer molding is secured around the periphery of the laminated panel to provide a finished edge and to conceal the exposed edges of the veneer facing the core. Then, using the outer molding as a guide a rectangular groove is cut through the veneer and into the core. Finally, an inner molding adapted to fit in the groove and having a pair of opposing lips to conceal the upper edges of the groove is glued in place to complete the door.

U.S. Pat. No. 6,689,301 discloses a method of manufacturing a door skin includes the steps of providing a wood composite flat blank. The blank is placed between the platens of a heated press, the platens being heated to a temperature sufficient to soften the resins in the blank and to thereby soften the blank. Sufficient pressure is applied to close the platens and thereafter the pressure is cyclically applied to increased pressure levels for thereby causing the blank to be deformed into a molded shape determined by the configuration of the platens. The molded blank is then removed from between the platens.

BRIEF SUMMARY OF THE INVENTION

The present invention relates to an economical method of manufacturing a door skin having the appearance of a solid wood door with raised or recessed panels in which an assembly of wood strips, veneer and a backing of fiberboard or similar material are compression molded to form the door skin. The method provides for the incorporation of machine-cut, wood strips having the desired profile to achieve panel areas having clean and crisp styling features into inexpensive molded door skins. Veneer sections are placed on the mold platen to define the rails and stiles areas. The wood strips define the perimeter of each raised or recessed panel and are placed on a steel mold platen. Veneer sections are also placed in the central panel areas.

A backing panel of a fiberboard material such as MDF or similar material is placed over the laid-up wooden strips and veneer. The mold applies pressure as two complementary mold platen sections are brought together under pressure with the door skin components held in place to form a door skin. Once these components have been molded into a door skin having the desired final shape, the skin may then be attached to one side of a frame and a second skin, manufactured in a similar manner as the first, may be attached to the opposite side of the frame. The frame can be hollow or may be partly or completely filled with a filling material to provide insulation, soundproofing, fireproofing, or to provide other desired properties to the assembled door.

The present invention may also be utilized to manufacture a door in which the door blank is shaped and becomes a mold to which the door skin components are applied.

The resulting door has the appearance of a solid wooden door and the natural wood grain exterior imparted by the wood strips and veneer can be finished by staining, varnishing, painting, or any other method common to finishing interior and exterior doors. The method provides a product which is an economical alternative to expensive solid wooden doors. The method may also be used to fabricate door skins for incorporation into items such as cabinet and furniture fronts.

BRIEF DESCRIPTION OF THE DRAWINGS

The above and other advantages and objects of the present invention will become more apparent from the following description, claims and drawings in which:

DETAILED DESCRIPTION OF THE DRAWINGS

Figure 1:
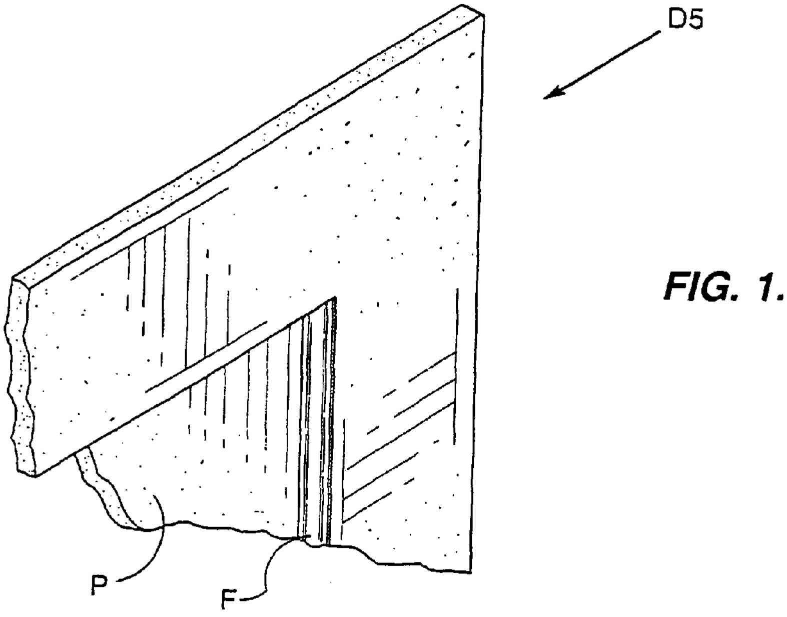
FIG. 1 is a perspective view of a corner of door skin molded by prior art processes.

FIG. 1 illustrates a corner section of a representative door skin DS fabricated according to prior art methods. The door skin DS has a number of recessed panels P with a frame-like perimeter F extending around each panel. Note the frame-like perimeter F is a molded edge and, upon inspection, does not provide the appearance of a solid wood panel door as the frame F does not have sharp edges as occur with machine cut surfaces. Generally, prior art door skins are fabricated from materials such as Masonite®, Melamine, Formica® and other high pressure laminates and, in some cases, may have a surface which has a wood grain appearance but generally these door skins are paint grade.

Figure 2:
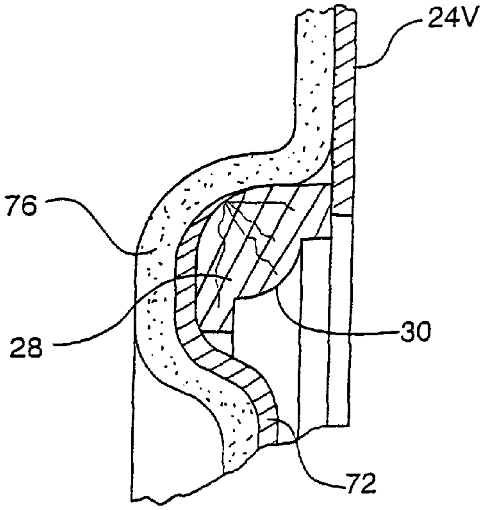
FIG. 2 is a cross section view of a door skin fabricated according to the present invention taken through a recessed panel feature.
Figure 4:
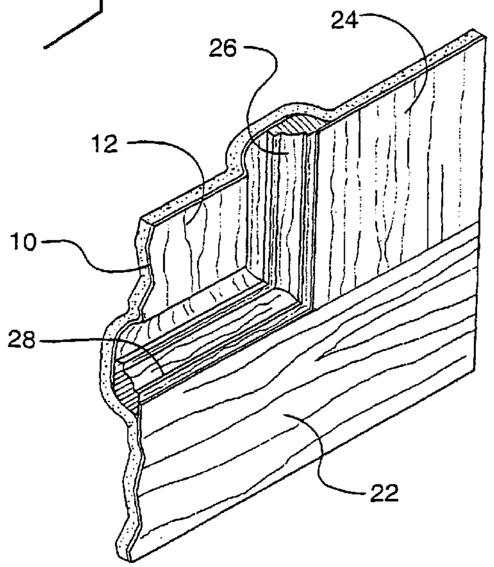
FIG. 4 is a perspective view of a corner of a door skin fabricated according to the present invention.

In contrast, FIG. 4 shows a corner section of a representative door skin 10 fabricated according to the present invention having a plurality of raised panels 12. The door skin 10 has rails 22 and stiles 24 faced with sections of strips of wood veneer, as will be explained. Each panel 12 is defined by a frame-like perimeter 26 comprised of strips of wood 28 which have been pre-cut having a desired profile. The profile 30 of the wood strips, as best seen in FIG. 2, provides well-defined, sharp edges 36 which enhance the appearance of the door skins creating a natural wood appearance in contrast to prior art molded door skins. The wood strips 28 may be solid wood strips, strips of wood which are cut and wrapped with veneer or strips separately molded or cut from various materials and finished to have the appearance of natural wood grain.

Figure 5:
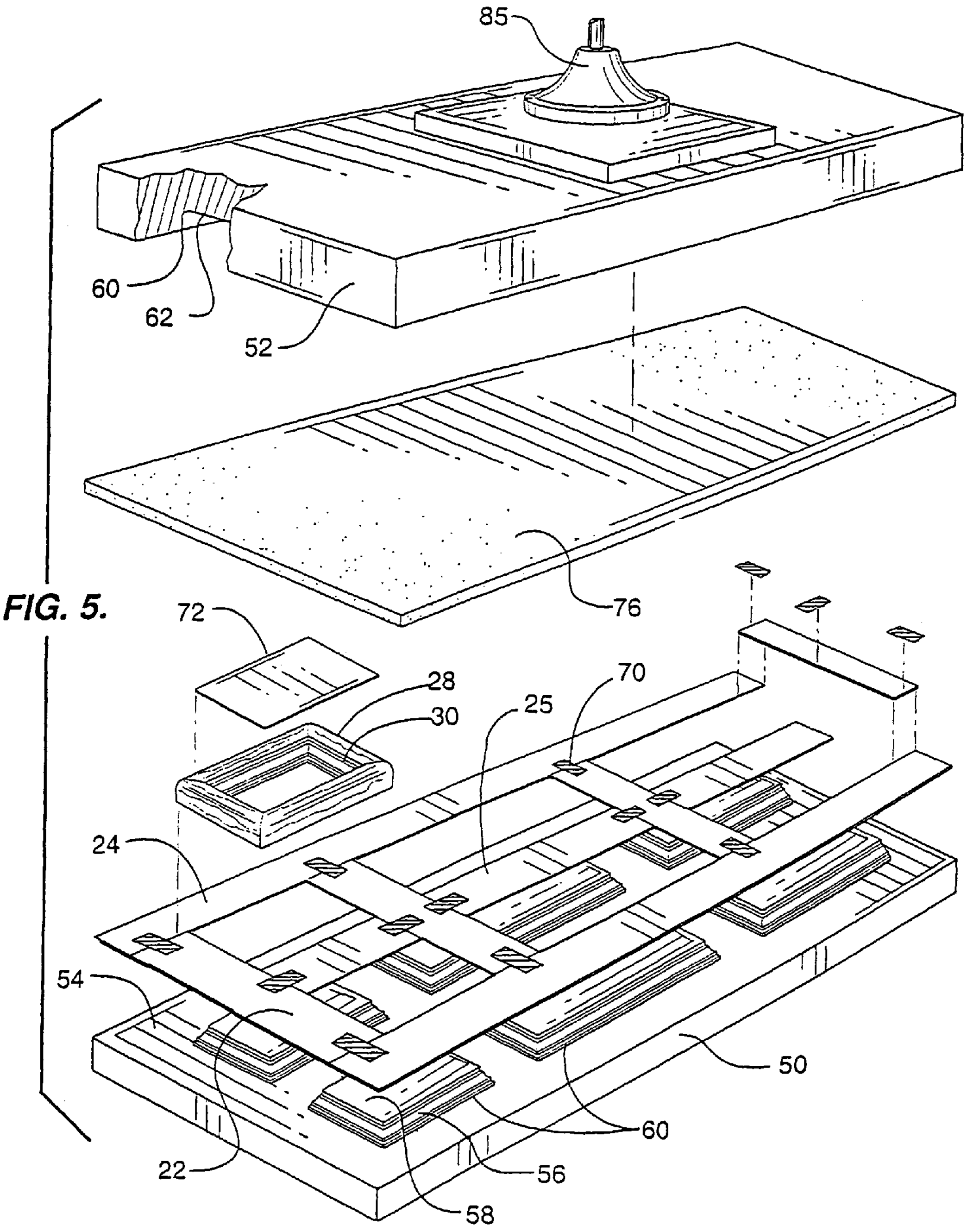
FIG. 5 is an exploded view illustrating the sequence of operational steps in laying up and molding a door skin according to the present invention, it being understood that a mold or press may be large having multiple sections forming a number of door skins in a single operation.

Referring to FIG. 5, a mold 55 has male and female platen sections 50, 52 which define the desired shape of the completed door skin. The mold may be a steel press compression mold or other mold such as a bladder mold which applies the necessary pressure to the components and may be large having multiple sections for simultaneously forming a number of door skins in a single operation. The mold has sections 60 which define panel areas which are shown as rectangular. The lower male mold platen 50 has a flat surface 54 extending around the panel areas. The mold panel areas each have a raised perimeter 56 extending around a central area 58 which forms a raised center in each panel 12. The raised perimeter 56 is configured at 60 to receive the exposed profile of the wood strips. The configuration of the perimeter 56 of the mold may vary consistent with the profile shape of the strips 28 which are positioned against the mold.

The upper female platen 52 is complimentary to the lower platen and has flat surfaces 60 and recesses 62 which receive the raised perimeter 56 of the lower platen. A central projection 64 is received in recess 58 of the lower platen and forms the raised panel. It will be apparent to those skilled in the art that the configuration of the platens will vary depending upon the configuration and size of the door skin panels to be formed and whether they are to be raised or recessed.

Veneer strips 22, 24 and 25 are placed on the lower mold surface in the rail, stile and in the areas between the panels 12. The veneer strips are thin strips or sections of wood. The veneer surfaces which will be the exposed surfaces in the completed door skin face downwardly on the flat surface of the lower mold. The veneer material may be any suitable wood type such as oak, mahogany, maple or other wood grains. The grain patterns are oriented to give the proper appearance of a solid wood door with the veneer strips 22V in the rail area running horizontally and the veneer strips 24V in the stile area running vertically to achieve the proper appearance. The veneer strips in the intermediate areas between the panels are oriented to conform to the grain pattern of solid wood doors.

It is noted that the door skin 10 is molded in a position with the resulting outer surface facing downwardly against the lower platen. Strips of wood 28 have a profile 30 are preferably machine cut by a router or similar wood working tool to create the desired cross-sectional shape. Although the strips are shown as linear, one or more in each frame may be curved or arcuate particularly if the resulting door skin is used in a cabinet door face. The strips may be cut from solid wood stock such as oak, mahogany or other wood or may be cut or shaped from less expensive wood or wood-like materials and then wrapped with a wood grain veneer. The strips 28 are laid in place extending around the perimeter of each panel area of the lower mold at 60. The corners of the strips are mitered to form a frame of the desired size and shape.

Figure 6:
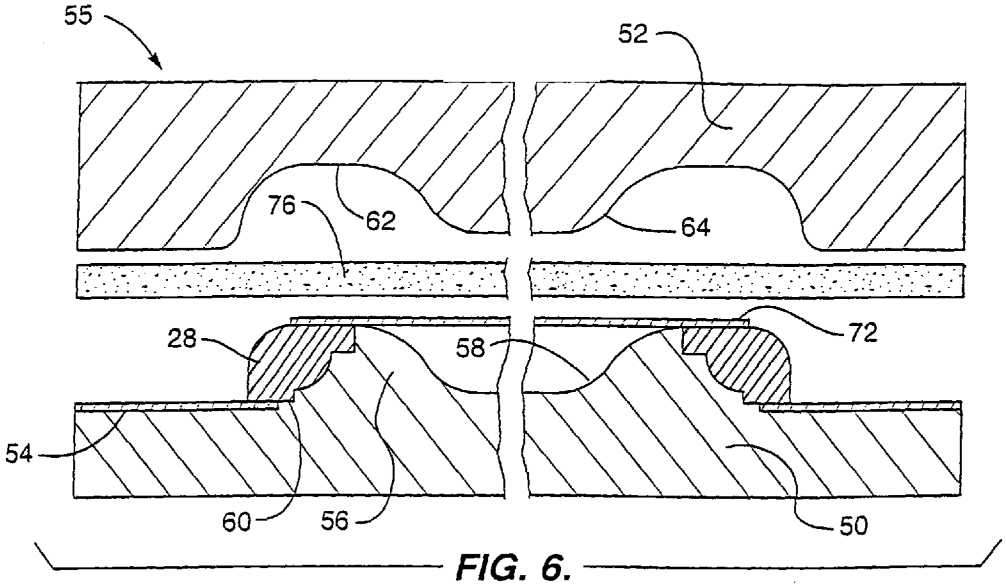
FIG. 6 is a cross-sectional view of male and female mold platens showing the molded door skin components prior to the molding process.

The veneer strips are placed on the mold platen 50 and secured by adhesive strips 70, as shown. Once these veneer strips have been laid up and the frame sections in place, veneer sections 72, rectangular and precise in shape, are placed overlying the center areas defined by the frames 26. This is seen in FIGS. 5 and 6. Note the veneer sections 72 extend across and overly the rear surface of the frame strips 28.

Next, a backing panel 76 of fiberboard such as MDF is placed over the laid up assembly. Other backing materials may be used such as low density fiberboard or high density fiberboard which has been prepared by heating. Also engineered materials such as those which are pliable mats of wood or other fiber containing a heat activated resin which solidifies the mat under application of heat and/or pressure may be used. These materials are well known to those in the door skin fabrication arts. The mold may now be closed bringing the male and female platen sections 50, 52 together compressing the laid up assembly.

Figure 3:
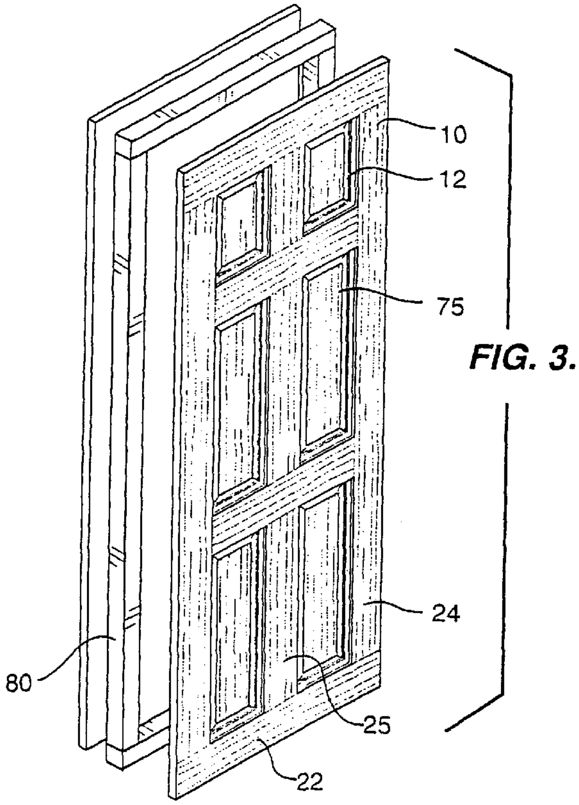
FIG. 3 is an exploded view showing door skins according to the present invention positioned on opposite sides of a frame prior to installation on a frame.
Figure 7:
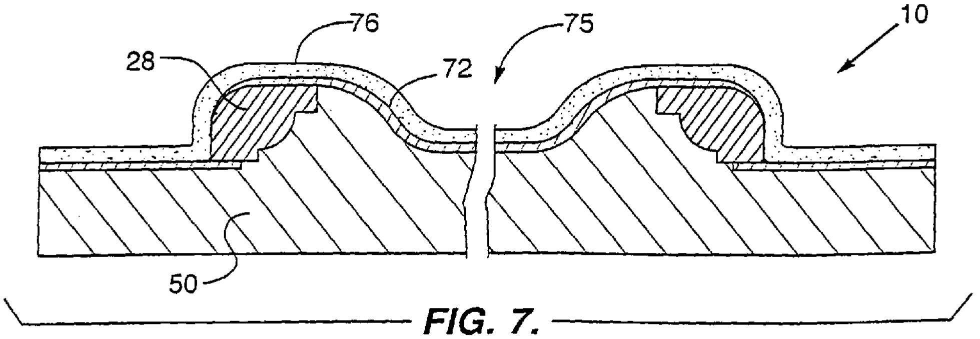
FIG. 7 is an end view of the male mold platen and the molded door skin components after molding pressure is released and the female mold removed.
Figure 8:
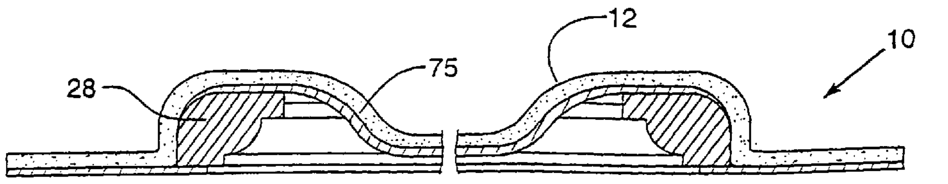
FIG. 8 is an end view of the finished molded door skin after molding pressure is released and the mold platens are removed.

FIG. 7 depicts the molded door skin 10 and the male mold portion 50 after a compression stage in which the mold portions 50, 52 are brought together under pressure by a hydraulic ram 85 or other compression device for a predetermined period of time and then released. The door skin 10 has taken the shape defined by mold platens 50, 52. Sheet 76, panel 72, strips 28 and veneer sections 22, 24 and 25 are adhered to one another so as to create a unitary molded door skin 10. Removing the molded door skin 10 from the male mold platen 50 completes the molding process. The resulting skin has panel areas 12 outlined by wood strips 28. A raised panel 75 is within the panel area 12. The wood strips and wood veneer combine to create the appearance of an expensive, solid wood, raised panel door, as seen in FIG. 2 at a fraction of the cost. The door is completed by applying door skins 10 to the opposite sides of a frame 80 as seen in FIG. 3.

The present invention may also be used to fabricate a completed raised panel door, as opposed to a door. The advantage is that it is not necessary to provide a separate frame to which the molded door skins are attached.

Figure 9:
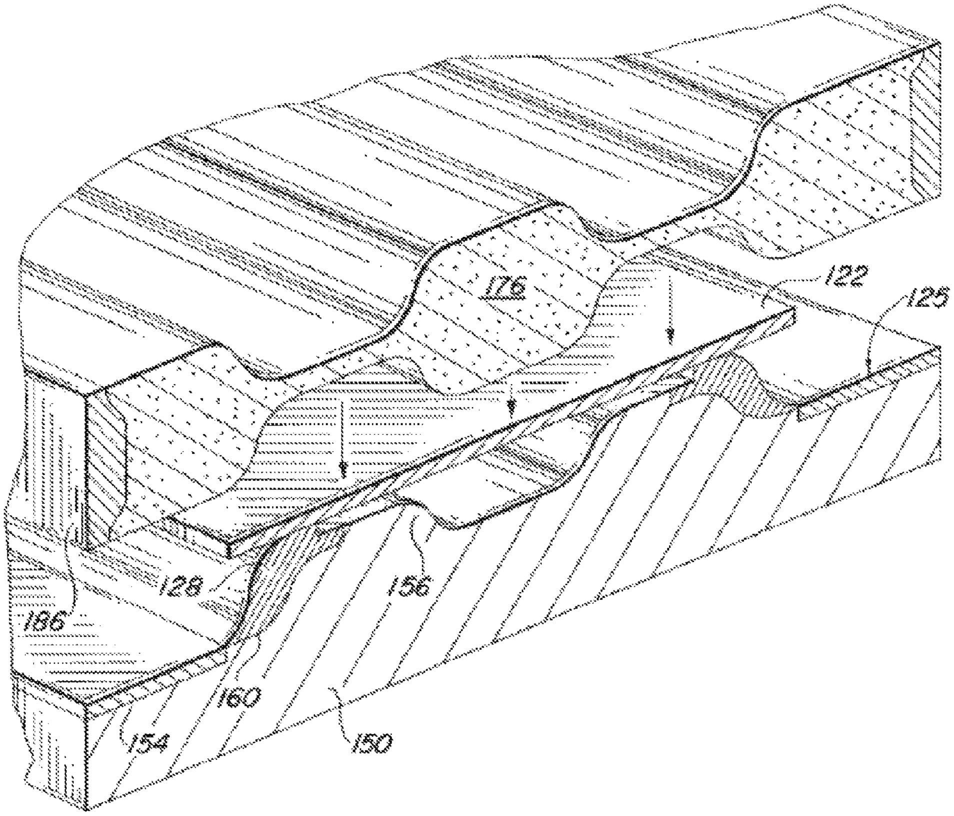
FIG. 9 is a cross-sectional view showing a shaped door blank positioned adjacent a mold component, the shaped door blank being a mold and also a part of the finished door.
Figure 10:
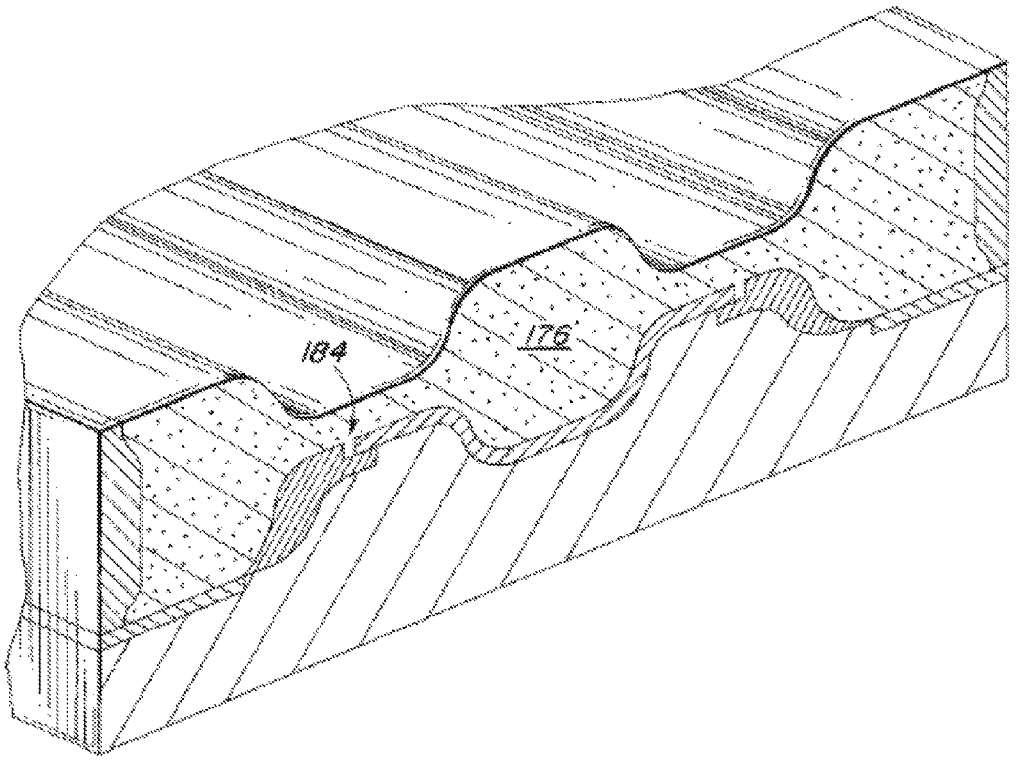
FIG. 10 is a view similar to FIG. 9 in which molding pressure has been applied to bring the components together.
Figure 11:
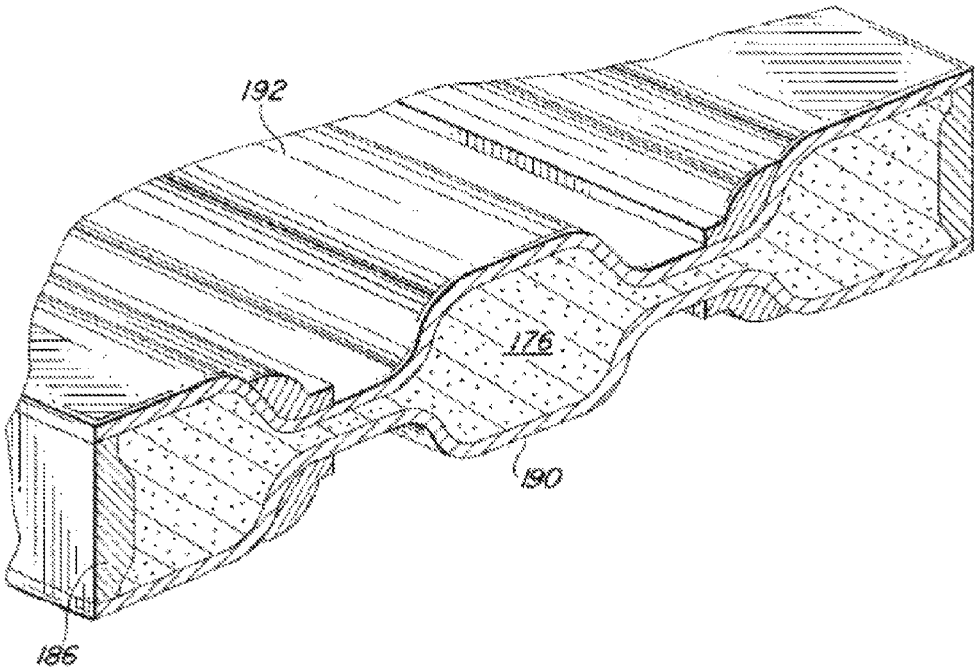
FIG. 11 is a cross-sectional view of a door fabricated as shown in FIGS. 9 and 10.

Referring to FIGS. 9 to 11, FIG. 9 shows a male mold platen 150 as has been described with reference to FIG. 5. The mold platen 150 has a flat surface 154 extending around the panel areas 160. The mold panel areas each have a raised perimeter 156 extending around the panel area. The mold platen 150 may be steel or other material.

The raised perimeter is configured to receive the exposed profile of wooden strips 128.

The lower mold 150 is laid up as has been described with veneer strips in the rail, stile and areas between the door panels. The veneer strips are thin strips of wood 122 and 125 having a surface which will be exposed in the completed door and the surface to be exposed is placed downwardly on the mold. The veneer material may be any suitable wood type such as oak, mahogany or other wood grain which give the appearance of a solid wood door. The grain patterns are oriented to provide the proper effect simulating a solid wood door.

The strips of material 128 such as wood strips fabricated by routing are provided having the desired cross section configuration the strips 128 are laid in place extending around the perimeter of each panel area of the lower mold 150. The corner of the strips 128 are mitered to form a panel frame of the desired size and shape. The veneer may be temporarily secured prior to compression by an adhesive such as tape 70 as seen in FIG. 5. The veneer section 122 is placed across the panel areas on the strips 128.

The opposing mold section 176 is formed or shaped from a blank of material such as MDF or particle board which will also become the core of the completed door. The opposite surfaces of the blank are shaped as by routing to the desired surface configuration conforming to the door panels. The opposite edges of the blank are also shaped to receive door edge inserts 186. The blank 176 is also routed at 184 to accommodate the veneer strips. Glue is applied to the entire surface of the blank 176 and pressure, preferably cold pressure, is applied to bring the blank 176 and mold 156 together by a hydraulic, pneumatic or other compression device for a predetermined time and then released. One surface of the blank is now adhered to the wood veneer and wood strips having the appearance of a solid panel door. The door is now ready for completion by reversing the door blank and again laying up the strips and veneer on the mold 150. The second side of the blank 176 and the mold platen 150 are compressed and both of the exposed surfaces 190, 192 of the door are completed. The edge strips 186 are in place and the inner door blank 176 fills the interior or core of the door.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A method of fabricating a paneled door comprising:

(a) providing a mold with a mold surface defining panel areas;

(b) placing decorative strips having a defined profile on said mold around said panel areas;

(c) placing veneer sections on said mold surface around said panel areas;

(d) placing a wood veneer panel on said strips extending over said panel areas and spaced from said mold panel areas to form a laid up door surface;

(e) providing a door blank having opposite first and second surfaces and opposite edges, said opposite surfaces being shaped having areas in which material is removed corresponding to areas on said mold around said panel areas, one of said surfaces disposed facing said mold;

(f) inserting door edge strips in said door blank edges; and (g) compressing said laid up door blank against said mold to form a door having a first surface having the appearance of a solid wood door with the veneer panel compressed into contact with the panel areas with the defined profile of the decorative strips extending around said panel areas and said veneer sections and panel exposed.

2. The method of fabricating a paneled door of claim 1 wherein the door blank is removed and reversed with the other surface positioned adjacent the mold, inserting said door edge strips in said door blank edges, compressing said door blank against said mold to form a door having a surface having the appearance of a solid wood door with the veneer panel compressed into contact with the panel areas with the defined profile of the decorative strips extending around said panel areas and said veneer sections and said wood veneer panel exposed and said blank forming the core of the completed door.

3. The method of fabricating a paneled door of claim 1 wherein the door blank has a thickness approximately corresponding to that of a completed door.

4. The method of fabricating a paneled door of claim 1 wherein the door blank is selected from the group of materials consisting of particle board and MDF.

5. The method, of fabricating a paneled door of claim 1 wherein the door blank is shaped by routing.

6. The method of fabricating a paneled door of claim 1 wherein a plurality of decorative strips are machine cut.

7. The method of fabricating a paneled door of claim 1 wherein the veneer sections are laid up using an adhesive.

8. The method of fabricating a paneled door of claim 1 wherein a glue is applied prior to compression.

9. The method of fabricating a paneled door of claim 5 wherein the door blank is routed to accept the decorative strips.

* * * * *